(12) United States Patent
Stingel, III et al.

(10) Patent No.: US 7,293,639 B2
(45) Date of Patent: Nov. 13, 2007

(54) CASE ROTATING SYSTEM

(75) Inventors: Frederick J. Stingel, III, Asheville, NC (US); Frederick J. Stingel, Jr., Asheville, NC (US); Ray Bruce Briggs, Asheville, NC (US); Jeffrey W. Stingel, Asheville, NC (US)

(73) Assignee: Vertique, Inc., Arden, NC (US)

( * ) Notice: Subject to any disclaimer, the term of this patent is extended or adjusted under 35 U.S.C. 154(b) by 0 days.

(21) Appl. No.: 11/367,830

(22) Filed: Mar. 3, 2006

(65) Prior Publication Data

US 2007/0205082 A1    Sep. 6, 2007

(51) Int. Cl.
*B65G 47/24* (2006.01)

(52) U.S. Cl. .................. 198/412; 198/411; 198/457.02

(58) Field of Classification Search ........... 198/457.02, 198/453, 394, 399, 400, 411, 412, 415, 416
See application file for complete search history.

(56) References Cited

U.S. PATENT DOCUMENTS

| | | | | |
|---|---|---|---|---|
| 1,860,718 A | * | 5/1932 | Mott ........................ | 198/412 |
| 1,960,307 A | * | 5/1934 | Fisk ........................ | 198/786 |
| 4,371,157 A | * | 2/1983 | Hunt et al. ................ | 271/2 |
| 4,699,262 A | * | 10/1987 | Nakano et al. ............ | 198/411 |
| 5,012,915 A | * | 5/1991 | Kristola et al. ........... | 198/411 |
| 5,109,975 A | * | 5/1992 | Prettie ...................... | 198/411 |
| 6,561,340 B2 | * | 5/2003 | Reatti ....................... | 198/454 |

* cited by examiner

*Primary Examiner*—James R. Bidwell
(74) *Attorney, Agent, or Firm*—Akerman Senterfitt; J. Rodman Steele, Jr.; Michael K. Dixon

(57) ABSTRACT

A case rotating system configured to rotate cases, such as boxes, in a case management system such that the cases are oriented in a consistent manner upon leaving the case rotating system. In at least one embodiment, the case rotating system may be configured to cause a case in a case rotating module to be rotated such that a short side of the case leads the case as the case leaves the case rotating module. The case rotating module may be formed from one or more conical rollers configured to rotate cases into a consistent orientation. The case rotating system may rotate cases that are in an incorrect orientation into a correct orientation. In addition, the case rotating system may operate such that cases entering the case rotating system in a correct orientation may not be rotated but may remain in a correct orientation upon leaving the case rotating system.

32 Claims, 7 Drawing Sheets

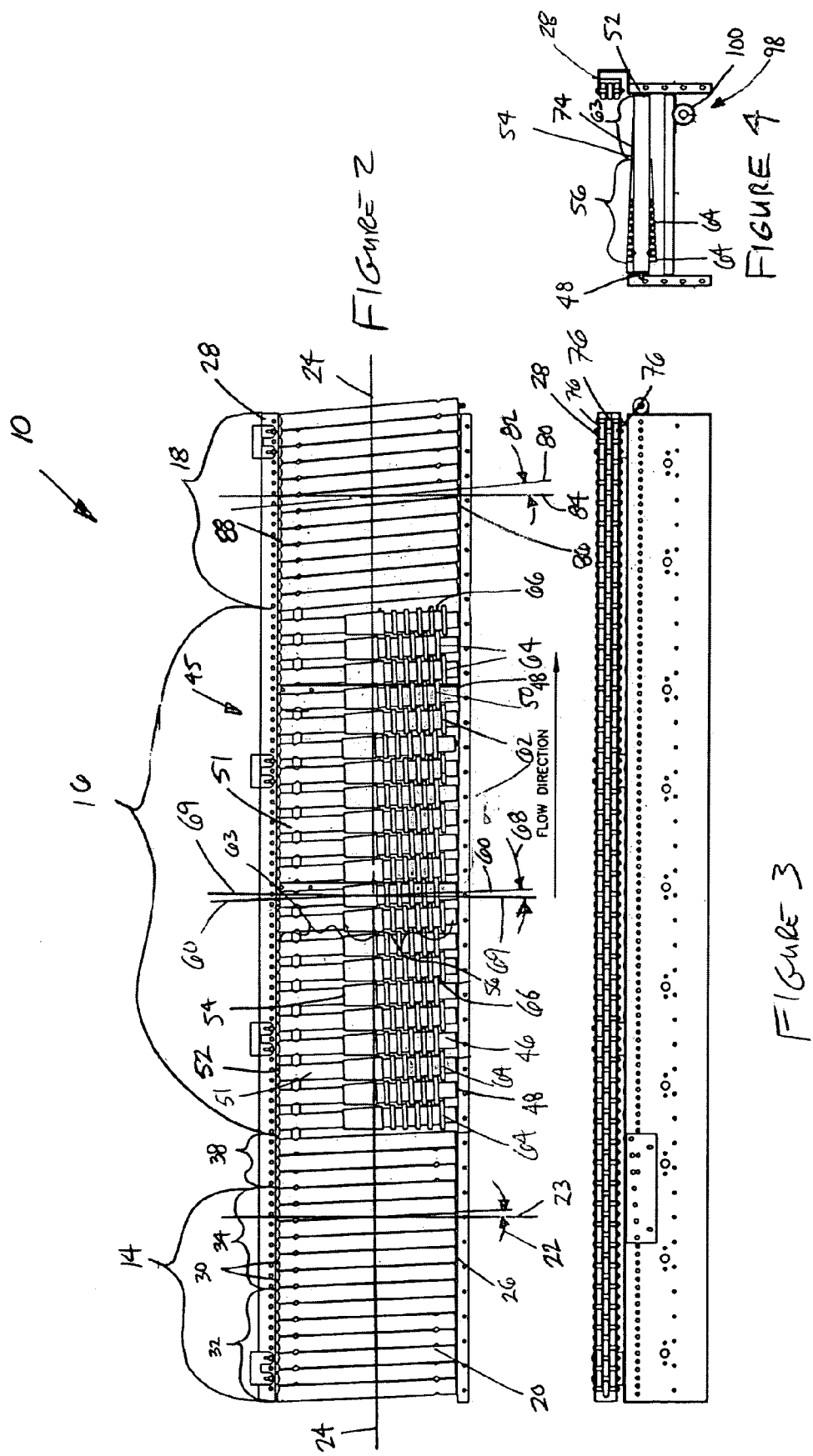

CASE ROTATING SYSTEM

FIELD OF THE INVENTION

This invention is directed generally to case handling systems, and more particularly to case rotating systems usable in case management and case shipping systems.

BACKGROUND

Case handling systems include a variety of systems and devices for moving cases, such as boxes and other containers. Many of these systems have been automated to increase the efficiency of the systems. The efficiency of these automated case handling systems is directly proportional to the ability of each component of the case handling systems to function consistently. Many systems require that cases be positioned in a particular orientation each time so that downstream handling systems may effectively process the cases. Often times, picking systems and other handling systems deposit cases on a horizontal line in a variable position and thus, a system is needed to properly align the boxes. In other embodiments, cases are positioned on a horizontal line in one position but need to be rotated into another orientation for further processing. Thus, a need exists for a device capable of consistently rotating cases for downstream processing in a case handling system.

SUMMARY OF THE INVENTION

This invention relates to a case rotating system configured to rotate cases into a particular orientation. The case rotating system may be used in case handling systems to enhance consistency of case orientation within a material handing line. The case rotating system may rotate cases that are in an incorrect orientation into a correct orientation. In addition, the case rotating system may operate such that cases entering the case rotating system in a correct orientation may not be rotated but may remain in a correct orientation upon leaving the case rotating system. Use of the case rotating system is not limited to any particular application but, for example and not by way of limitation, may be used with a gantry, a layer pick, a storage device, a horizontal line, or with other appropriate equipment. The case rotating system may also be sized to accommodate cases of different sizes.

The case rotating system may include one or more case input modules adapted to move at least one case within the case rotating system. The case input module may be formed from a plurality of rollers. The plurality of rollers may have longitudinal axes that are generally parallel to each other and may be generally parallel to a longitudinal axis of the case rotating system. The longitudinal axes of the plurality of rollers may also be positioned at an acute angle relative to a line orthogonal to a longitudinal axis of the case rotating system. The case input module may include a first section configured to move cases at a first rate of speed and a second section positioned between the first section and a case rotating module and configured to move the cases at a second rate of speed that is greater than the first rate of speed to increase distances between adjacent cases to facilitate unobstructed rotation of cases in the case rotating module.

The case rotating system may include a case rotating module configured to rotate cases such that the cases leave the case rotating module in a consistent orientation. The case rotating system may be formed from one or more rotating devices configured to rotate cases. In at least one embodiment, the rotating devices may be formed from rollers. The rollers may be configured such that a first end of the rollers may have an outer surface configured to rotate at a first rotational velocity that is larger than a second rotational velocity at which an outer surface of a second end of the rollers positioned to contact the cases is configured to rotate.

In at least one embodiment, the case rotating module may be formed from one or more conical rollers positioned proximate to the case input module in a position to receive the at least one case from the case input module. The conical roller may include a first end having an outer surface diameter that is larger than an outer surface diameter of a second end of the at least one conical roller positioned to contact the at least one case. The conical roller may include a case drive section that has a diameter less than the first end of the conical roller. The case drive section may have a length at least as large as a width of a short side of the case, yet shorter than a length of a long side of the case.

In one embodiment, the case rotating module may include a plurality of conical rollers having conical outer contact surfaces and having longitudinal axes aligned generally parallel to each other. The rollers may include a plurality of rings having outer surfaces that have outer surface diameters of progressively smaller diameters moving from the first end to the second end of the conical roller. The rings of the conical rollers may be offset along the longitudinal axis of every other conical roller such that the rings may fit into a gap created between adjacent rings of an adjacent conical roller. Such a configuration enables the conical rollers to be positioned such that longitudinal axes of the conical rollers are generally parallel to each other.

The longitudinal axis of each of the plurality of conical rollers may be nonparallel and nonorthogonal relative to a longitudinal axis of the case rotating system. For instance, the longitudinal axis of each of the plurality of conical rollers may be aligned relative to the longitudinal axis of the case rotating system such that the first end having an outer surface diameter that is larger than an outer surface diameter of the second end of each conical roller is positioned further downstream than the second end of the conical rollers to direct cases toward a side of the case rotating system proximate to the second end of the conical rollers. The longitudinal axis of each of the plurality of conical rollers may form an acute angle less than about twenty degrees with a line orthogonal to the longitudinal axis of the case rotating system, and in one embodiment, the angle may be between about one degree and about ten degrees relative to a line orthogonal to the longitudinal axis of the case rotating system.

The case rotating system may also include a case output module positioned proximate to the case rotating module for receiving cases from the case rotating module. The case rotating system may be formed from any device capable of moving the cases. In one embodiment, the case output module may include a plurality of rollers. The rollers may be positioned generally orthogonal to a longitudinal axis of the case rotating system. In another embodiment, the roller may be positioned at an acute angle relative to a line orthogonal to the longitudinal axis of the case rotating system. The rollers may be positioned in the same orientation as the rollers of the case input module or at a greater angle. The case output module may feed cases to an automated or manual operation when orientation cases are preferred or other appropriate device.

The case rotating system may include a transition module positioned between the case input module and the case rotating module to provide a transition between an upper support surface on the case input module and an upper support surface of the case rotating module. The transition module may be formed from one or more rollers.

In one embodiment, a second section of the case input module may be configured to move a case generally at rate of speed that is greater than the rate of speed of a first section of the case input module to separate the cases to prevent contact of cases during rotation in the case rotating module. The case rotating module may be configured to move a case generally at rate of speed that is approximately equal to the rate of speed of the second section of the case input module. The case output module may be configured to move the cases at a rate of speed less than the second rate of speed of the case rotating module, which causes the distance between adjacent cases to be reduced in the case output module relative to the case rotating module.

The case rotating module may also include a guardrail positioned generally parallel with a longitudinal axis of the case rotating system and proximate to the second end of the conical rollers. The guardrail may be configured from any height appropriate to restrict the cases to the case input, case rotating, and case output modules. The guardrail may include a plurality of rollers positioned generally orthogonal to the longitudinal axis of the case rotating system to facilitate movement of the at least one case through the case rotating system. The guardrail may also be formed from other devices capable of facilitating movement of the cases through the case rotating system.

An advantage of this invention is that the case rotating system may rotate cases that are in an incorrect orientation into a correct orientation and may operate such that cases entering the case rotating system in a correct orientation may not be rotated but remain in a correct orientation upon leaving the case rotating system.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 2 is a top view of the case rotating system shown in FIG. 1.

FIG. 3 is a side view of the case rotating system shown in FIG. 1.

FIG. 4 is an end view of the case rotating system shown in FIG. 1.

DETAILED DESCRIPTION OF THE INVENTION

Figure 1:
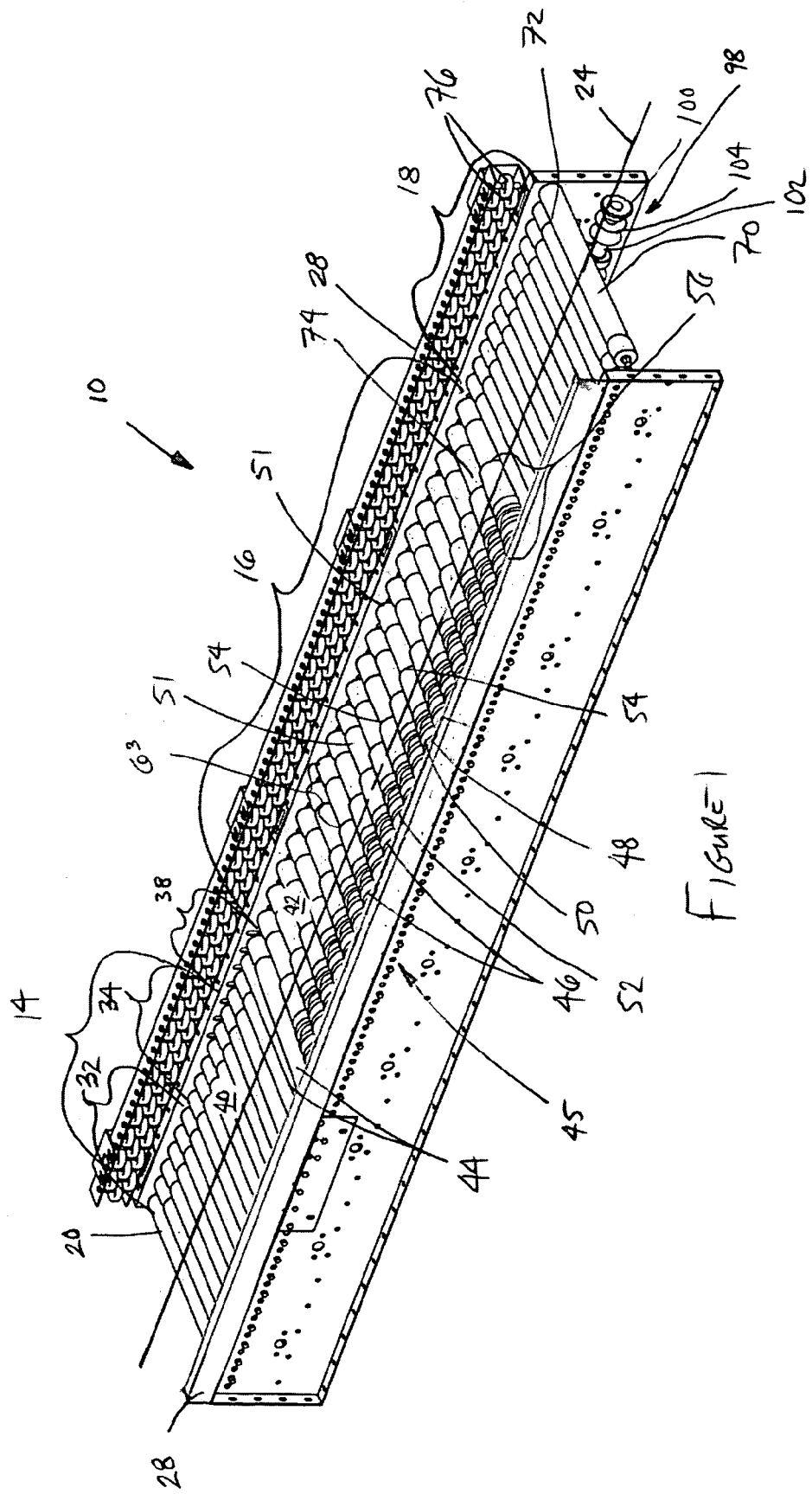
FIG. 1 is a perspective view of a case rotating system including aspects of this invention.

As shown in FIGS. 1-11, this invention is directed to a case rotating system 10 configured to receive cases 12 within a case handling system and output the cases 12 in a consistent orientation. The cases 12 may be any container, such as, but not limited to, cardboard boxes and other devices typically used to contain freight, such as consumer items, including beverage cans or other items. The case rotating system 10 may be formed from a case input module 14 for delivering cases 12 to a case rotating module 16, the case rotating module 16 adapted to rotate cases 12, and a case output module 18 for receiving cases in consistent orientation from the case rotating module 16. The case rotating system 10 may rotate cases 12 that are in an incorrect orientation into a correct orientation. In addition, the case rotating system 10 may operate such that cases entering the case rotating system 10 in a correct orientation may not be rotated and may remain in a correct orientation upon leaving the case rotating system 10.

The case input module 14 may be formed from any device capable of delivering cases 12 to the case rotating module 16. For instance, the case input module 14 may be formed from a plurality of rollers 20, as shown in FIGS. 1, 2, 5-7, one or more conveyor belts, or other appropriate devices. The rollers 20 may be positioned generally parallel to each other. The rollers 20 may be positioned generally orthogonal to the longitudinal axis 24 of the case rotating system 10. In another embodiment, the rollers 20 may be configured to force the cases 12 against a guardrail 28. In some embodiments, cases 12 may be delivered to the case input module 14 in various positions on a horizontal line. The case input module 14 may relocate the cases 12 to bear against a guardrail 28 on one side of the case input module 14. The case input module 14 may be any length necessary to complete this task. In particular, the rollers 20 of the case input module 14 a plurality of rollers may be positioned nonparallel and nonorthogonal relative to a line 23 that is generally orthogonal to a longitudinal axis 24 of the case rotating system 10 such that cases 12 are directed to one side of the case input module 14 when passed over the rollers 20. More specifically, the rollers 20 may be positioned at an angle 22 relative to a line 23 that is orthogonal to a longitudinal axis 24 of the case rotating system 10. The angle 22 may be an acute angle such that a first end 26 of the roller 20 positioned furthest from a guardrail 28 against which a case 12 will bear against while traveling through the case rotating system 10 may be positioned further downstream than a second end 30 of the roller 20. The angle 22 may be less than about 20 degrees, and more particularly, may be between about one degree and about 10 degrees.

The case input module 14 may also be formed from one or more sections for changing the spacing between adjacent cases 12. In particular, the case input module 14 may include a first section 32 configured to move the cases 12 at a first rate of speed and a second section 34 positioned between the first section 32 and the case rotating module 16 and configured to move the cases 12 at a second rate of speed that is greater than the first rate of speed. The increased rate of speed in the second sections 34 increases the distance 36 between adjacent cases 12 to facilitate unobstructed rotation of cases in the case rotating module 16. In at least one embodiment, the first section 32 may be capable of operating such that the cases 12 travel at a rate of about 60 feet per minute, and the second section 34 may be capable of operating such that the cases 12 travel at a rate of about 120 feet per minute. In another embodiment, the case input module 14 may operate at a single speed. However, this rate of speed may be greater than the speed of operation of a system immediately upstream from the case input module 14. The upstream system (not shown) may operate at a slower speed than the case input module 14, enabling the cases 12 to be separated in the case input module 14.

The case rotating system 10 may include a transition module 38 positioned between the case input module 14 and the case rotating module 16 to provide a transition. In particular, an upper support surface 40 on the case input module 14 and an upper support surface 42 of the case rotating module 16 may reside indifferent planes. In such a configuration, the transition module 38 may be used to provide a transition between the case input module 14 and the case rotating module 16. As shown in FIGS. 1, 2 and 5-7, the transition module 38 may be formed from one or more rollers 44. The rollers 44 may be positioned in various orientations to create a transition from the case input module 14 and the case rotating module 16. In one embodiment, an angular orientation of the rollers 44 may change to create a transition between the case input module 14 and the case rotating module 16.

The case rotating module 16 of the case rotating system 10 may be configured to rotate cases 12 so that the cases 12 may be expelled from the case rotating module 16 in a consistent orientation. The case rotating module 16 may be configured such that cases 12 that are in an incorrect orientation may be rotated into a correct orientation. In addition, the case rotating module 16 may operate such that cases 12 entering in a correct orientation may not be rotated but may remain in a correct orientation upon leaving the case rotating module 16. Thus, the orientation of incorrect cases 12 may be corrected while the orientation of a correct case 12 may remain unchanged.

Figure 8:
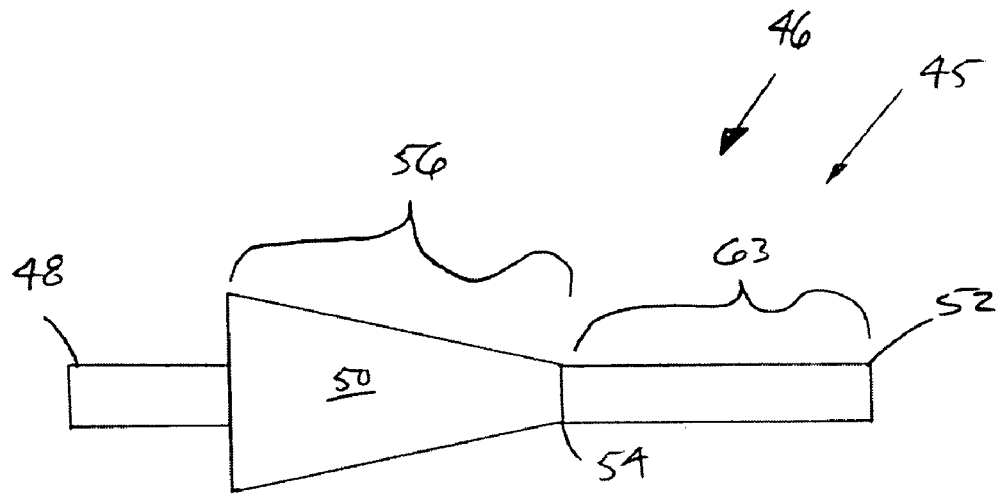
FIG. 8 is a side view of a roller of the case rotating module.
Figure 9:
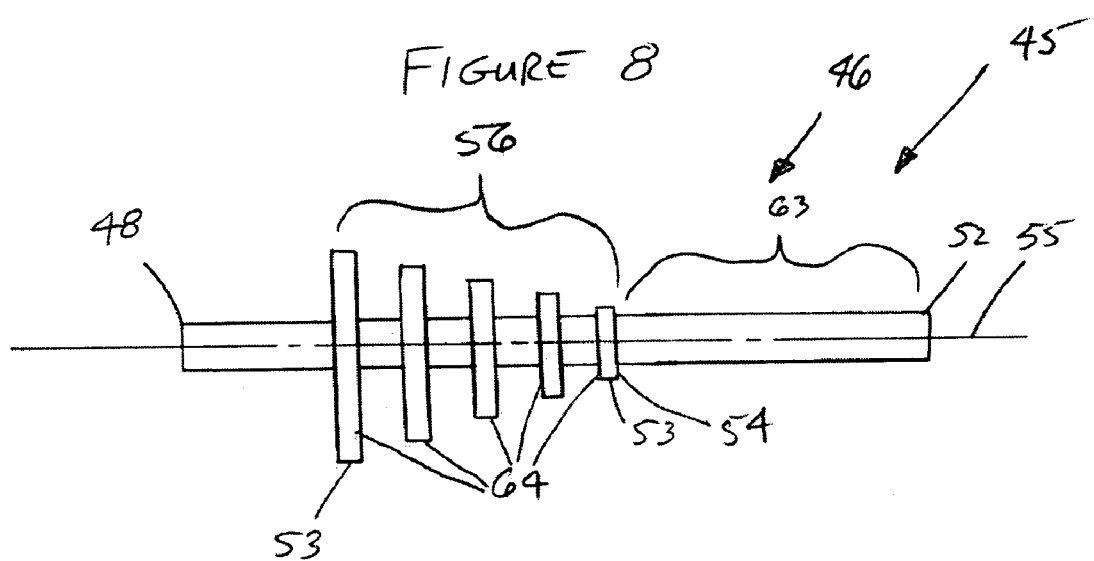
FIG. 9 is a side view of an alternative roller of the case rotating module.
Figure 10:
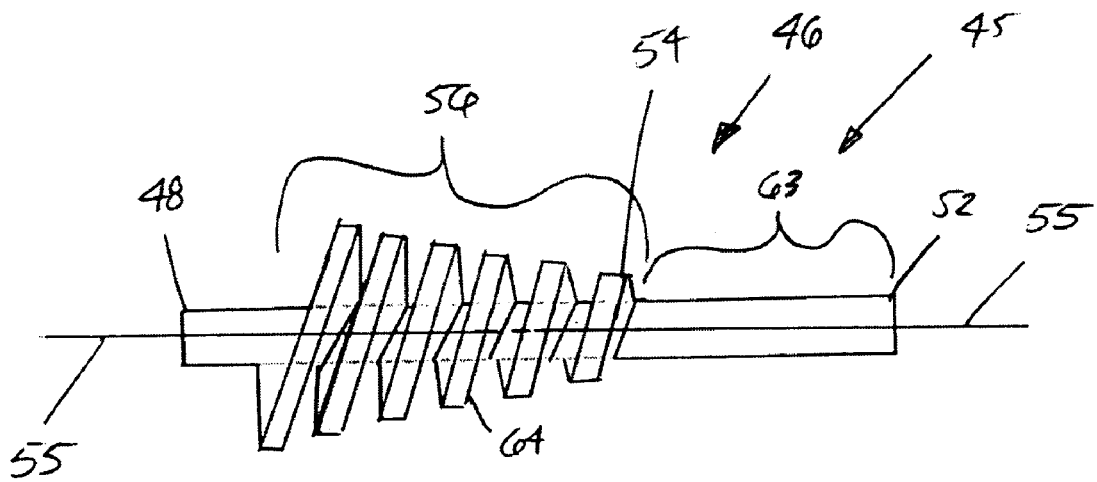
FIG. 10 is a side view of another alternative roller of the case rotating module.

The case rotating module 16 may be formed from one or more rotating devices 45 configured to rotate cases 12. In at least one embodiment, the rotating devices 45 may be formed from rollers 46, as shown in FIGS. 8-11. The rollers 46 may be configured such that a first end 48 of the rollers 46 may have an outer surface 50 configured to rotate at a first rotational velocity that is larger than a second rotational velocity at which an outer surface 51 of a second end 52 of the rollers 46 positioned to contact the cases 12 is configured to rotate. Examples of such configurations are shown in FIGS. 8-11, however, the configuration of the rollers 46 is not limited to these embodiments. Rather, these embodiments are presented as exemplary embodiments. As shown in FIG. 8, the roller 46 may be formed from a continuous outer surface 50 forming conical section 56. In another embodiment, as shown in FIG. 9, the roller 46 may be formed from rings 64 whose outermost surfaces 53 form the conical shape of the conical section 56. The rings 64 may be positioned generally orthogonal to a longitudinal axis 55 of the roller 46, as shown in FIG. 9, or may be nonorthogonal to the longitudinal axis 55 of the roller 46, as shown in FIG. 10. In fact, the roller 46 may be formed from a single ring 64, as shown in FIG. 10, in a helical formation. The conical section 56 may be formed from any shape capable of having an outer surface with a larger diameter than an outer surface diameter of the case drive section 63.

Figure 11:
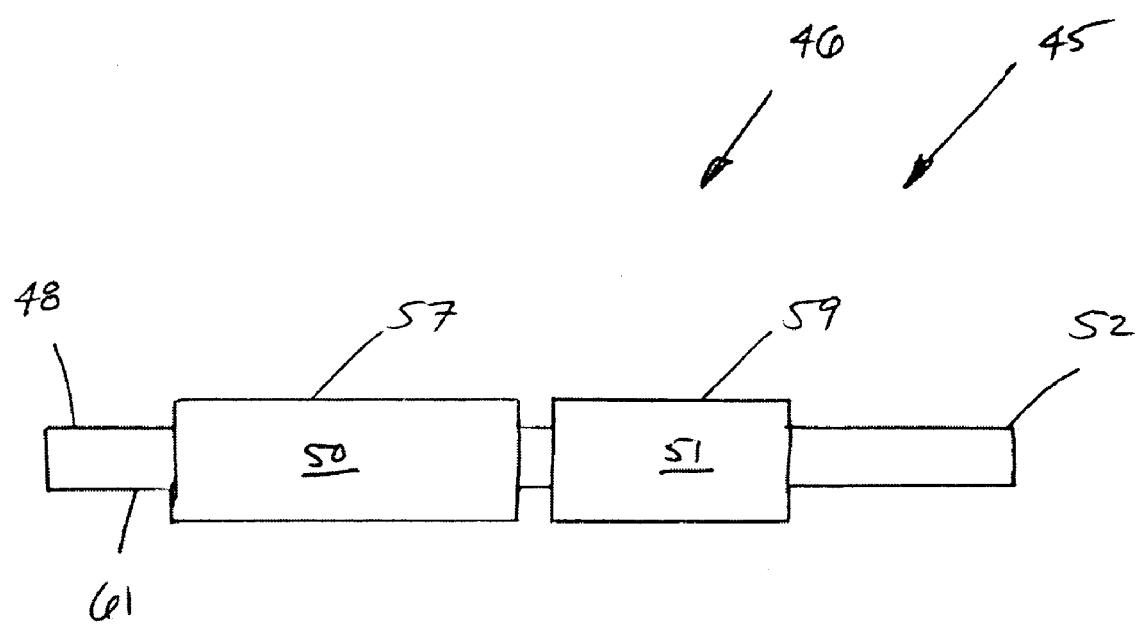
FIG. 11 is a side view of yet another alternative roller of the case rotating module.

In yet another embodiment of the rollers 46, as shown in FIG. 11, the rollers 46 may include one or more outer surfaces 50, 51 that may or may not be coupled together to rotate together. Rather, each outer surface 50, 51 may be driven separately at different rotational velocities. The first section 57 may be rotatable relative to an inner shaft 61 enabling the first section 57 to be rotated at a velocity that is different than a rotational velocity of the second section 59 and the inner shaft 61. The rollers 46 may be formed from materials such as, but not limited to, metals, such as aluminum, steel, and others; plastics such as ultrahigh molecular weight plastic (UHMW) and others; rubber; and other appropriate materials.

In another embodiment, the rollers 46 may be conical rollers 46 that may each include a first end 48 having a diameter of an outer surface 50 that is greater than a diameter of an outer surface 50 proximate to a second end 52 of the roller 46. The second end 52 of the conical roller 46 may be in close proximity to the guardrail 28 against which cases 12 bear against while traveling through the case rotating system 10. Guardrail 28 may be positioned on either side or both sides of the case rotating system 10. However, it is preferable that a distance between the guardrail 28 and a first end 54 of the conical portion 56 not exceed a length of a long side 58 of a case 12. Otherwise, cases 12 will not rotate. Furthermore, in embodiments in which a guardrail 28 is positioned on both sides of the case rotating module 16, the width of the guardrails 28 should be greater than a diagonal length of a case 12 so that the case 12 may rotate in the case rotating module 16 without interference from the guardrails 28. In one embodiment, the case rotating module 16 may be about ten feet in length. In other embodiments, the case rotating module 16 may be shorter or longer, such as 30 feet long or longer, depending on the application.

The conical portion 56 of the conical rollers 46 may extend for an entire length of a roller 46 or only a portion of the roller 46, as shown in FIGS. 2 and 8-10. The conical rollers 46 may also include a case drive section 63, as shown in FIGS. 1, 2 and 8-10. The case drive section 63 may have a diameter of an outer surface 51 that is less than a diameter of the outer surface 50 of the conical section 56. As such, the horizontal speed at which a portion of the case 12 is driven is less than a horizontal speed at which the conical section 56 drives other portions of the case 12. In one embodiment, the diameter of the case drive section 63 is substantially constant. The case drive section 63 may prevent cases 12 that enter the case rotating module 16 in a correct orientation from rotating. In particular, if the correct orientation of a case 12 is a short side 78 being the leading edge of the case 12, then the case drive section 63 may be configured to have a width sufficient to prevent the conical portion 56 from imparting a rotational force on the case 12. In at least one embodiment, the case drive section 63 may have a width greater than or equal to a width of the short side 78 of the case 12. This configuration enables a case 12 positioned correctly when it enters the case rotating module 16 with a short side 78 leading to not be affected by the conical portions 56 of the rollers 46. Thus, the case 12 remains correctly positioned after passing through the case rotating module 16.

However, if a case 12 enters the case rotating module 16 in an incorrect orientation and a sufficient portion of the case 12 contacts the conical portion 56 of the roller 46, the case 12 may be rotated such that the short side 78 becomes the leading edge of the case 12 as the case is moved into the case output module 18. Nonetheless, it is possible that a portion of a case 12 may contact the conical portion 56 of the roller 46 without the case 12 rotating. The exact length of the case drive section 63 and the conical portion of a roller 46 differs depending on the lengths of the short side 78 and the long side 58 of a case 12 desired to be handled by the case rotating system 10. In another embodiment, the length of the case drive section 63 may be less than the width of the short side 78 of the case 12 such that the conical section 56 contacts part of the case 12 but does not cause the case 12 to rotate.

In one embodiment, a longitudinal axis 60 of each of the conical rollers 46 may be positioned generally parallel to each other. The conical portion 56 of the conical roller 46 may or may not be formed from a continuous, conical outer surface 62. The outer surface 62 may be discontinuous in a direction parallel to the longitudinal axes 60 of the rollers 46 or in a radial direction, or any combination thereof. In one embodiment, as shown in FIG. 2, the outer surface 62 of the conical roller 46 may be formed from one or more rings 64. The rings 64 may have outer surface diameters of progressively smaller diameters moving from the first end 54 to the second end 52 of the conical portion 56 of the conical roller 46, thereby forming a conical shape, as shown in FIGS. 4, 9 and 10.

The rings 64 may be spaced apart from each other along the longitudinal axis 60 of the conical rollers 46 a distance slightly greater than a width of the rings 64 to form gaps 66. In at least one embodiment, a conical portion 56 may be formed from about five rings 64. In other embodiments, the conical portion 56 may include a fewer number or greater number of rings 64. As shown in FIG. 2, the rings 64 may be offset along the longitudinal axis 60 of every other conical roller 46 such that the rings 64 may fit into the gap 66 created between adjacent rings 64 of an adjacent conical roller 46. Positioning the rings 64 in this manner enable the longitudinal axes 60 of the conical rollers 46 to be placed parallel to each other and interwoven with each other. It is not required that the rings 64 be interwoven with gaps 66 of adjacent rollers 46. Rather, in another embodiment, the rollers 46 may be spaced apart a sufficient distance to prevent interference between adjacent rollers 46 while the longitudinal axes 60 of the rollers 46 are positioned generally parallel to each other.

In one embodiment, the longitudinal axes 60 of the conical rollers 46 may be positioned generally orthogonal to the longitudinal axis 24 of the case rotating system 10. In another embodiment, the conical rollers 46 may be configured to force the cases 12 against a guardrail 28. In particular, as shown in FIG. 2, the conical rollers 46 may be positioned nonparallel and nonorthogonal relative to the longitudinal axis 24 of the case rotating system 10. For instance, the conical rollers 46 may be positioned at an angle 68 relative to a line 69 orthogonal to a longitudinal axis 24 of the case rotating system 10, wherein the angle 68 may be an acute angle such that a first end 48 of the conical roller 46 positioned furthest from the guardrail 28 against which a case 12 bears against while traveling through the case rotating system 10 is positioned further downstream than a second end 52 of the conical roller 46. The angle 68 may be less than about 20 degrees, and more particularly, may be between about one degree and about ten degrees. In one embodiment, the angle 68 at which the conical rollers 46 are positioned may be substantially equal to the angle 22 at which the rollers 20 forming the case input module 14 are positioned.

The case rotating system 10 may also include a case output module 18. The case output module 18 may be any device capable of receiving cases 12 from the case rotating module 16 and moving the cases 12. For instance, the case output module 18 may be formed from one or more rollers 70, as shown in FIGS. 1, 2 and 5-7, one or more conveyor belts, or other appropriate devices. A plane 72 created by the rollers 70 of the case output module 18 may be positioned relative to a plane 74 formed by the conical rollers 46 of the case rotating module 16 such that cases 12 traveling from the case rotating module 16 to the case output module 18 may be transferred without damaging the contents of the cases 12. In one embodiment, as shown in FIGS. 1-7, the plane 72 of rollers 70 may be positioned lower than the plane 74 of conical rollers 46. However, a vertical distance between the planes 72, 74 of about one to three inches is typically not sufficient to create enough force to damage contents of a case 12 as the case 12 is transferred from the case rotating module 16 to the case output module 18. The case output module 18 may have any appropriate length.

The rollers 70 may be rotated at any one of various rates of speed dependent upon a particular application for which the case rotating system is used. In one embodiment, the rollers 70 may be rotated at a rate of speed approximately equal to the rate of speed of the rollers 20 of the case input module 14 and about one half of the rate of speed of the conical rollers 46 of the case rotating module 16. In such a configuration, the cases 12 are separated from each other a sufficient distance to rotate without contacting each other in the case rotating module 16 and upon entering the case output module 18 are returned to the spatial arrangement between adjacent cases 12 that existed in the case input module 14. The spatial arrangement between adjacent cases 12 may be made smaller or larger by changing the speed of the rollers 70 of the case output module 18 relative to the rollers 46 of the case rotating module 16.

In one embodiment, the longitudinal axes 80 of the rollers 70 may be positioned generally orthogonal to the longitudinal axis 24 of the case rotating system 10. In another embodiment, the rollers 70 may be configured to force the cases 12 against a guardrail 28. In particular, the rollers 70 may be positioned nonparallel and nonorthogonal relative to the longitudinal axis 24 of the case rotating system 10. For instance, the rollers 70 may be positioned at an angle 82 relative to a line 84 orthogonal to a longitudinal axis 24 of the case rotating system 10, wherein the angle 82 may be an acute angle such that a first end 86 of the roller 70 positioned furthest from the guardrail 28 against which a case 12 bears against while traveling through the case rotating system 10 is positioned further downstream than a second end 88 of the roller 70. The angle 82 may be less than about 20 degrees, and more particularly, may be between about one degree and about ten degrees. In one embodiment, the angle 82 at which the rollers 70 are positioned may be approximately twice the angle 22 at which the rollers 20 forming the case input module 14 are positioned and about twice the angle 68 at which the conical rollers 46 are positioned.

The case rotating system 10 may include one or more guardrails 28. The guardrails 28 may be positioned on either side of the case rotating module 16 or on both sides. The guardrail 28 may be configured to include one or more rollers 76 positioned to assist movement of a case 12 through the case rotating system 10. The rollers 76 may be positioned generally orthogonal to the longitudinal axis 24 of the case rotating system 10 such that the rollers 76 spin when contacted by a case 12 moving through the system 10. As shown in FIGS. 1-7, the guardrails 28 may include an alternating pattern of one roller 76 positioned adjacent to two rollers 76 and offset between the two rollers 76. The height of the guardrail 76 may be adjusted and constructed for each particular application to prevent cases 12 from inadvertently falling from the case rotating system 10. The guardrails 28 are not required to have rollers 76, but may include other devices facilitating passage of the cases 12.

The rollers 20, 44, 46, 70 of the case rotating system 10 may be removable to facilitate easy maintenance and to make the case rotating system 10 adaptable. For instance, the lengths of the rollers 20, 44, 46, 70 may also be shortened or lengthened to change the case size capacity of the case rotating system 10. The rollers 20, 44, 46, 70 may be driven with any appropriate drive mechanism and power source. For instance, the rollers 20, 44, 46, 70 may be driven using a conventional line shaft conveyor 98, as shown in FIG. 1. The line shaft conveyor 98 may be formed from a sprocket 100 coupled to a drive shaft 102. A plurality of spools 104 may be coupled to the drive shaft 102. A band (not shown) may be looped around each spool 104 and around each roller 20, 44, 46, 70 to drive the roller. The rollers 20, 44, 46, 70 are not limited to being rotated in this manner, but may be rotated in other manners as well. The speed of the rollers 20, 44, 46, 70 may be changed by changing the size of the spools 104.

Figure 5:
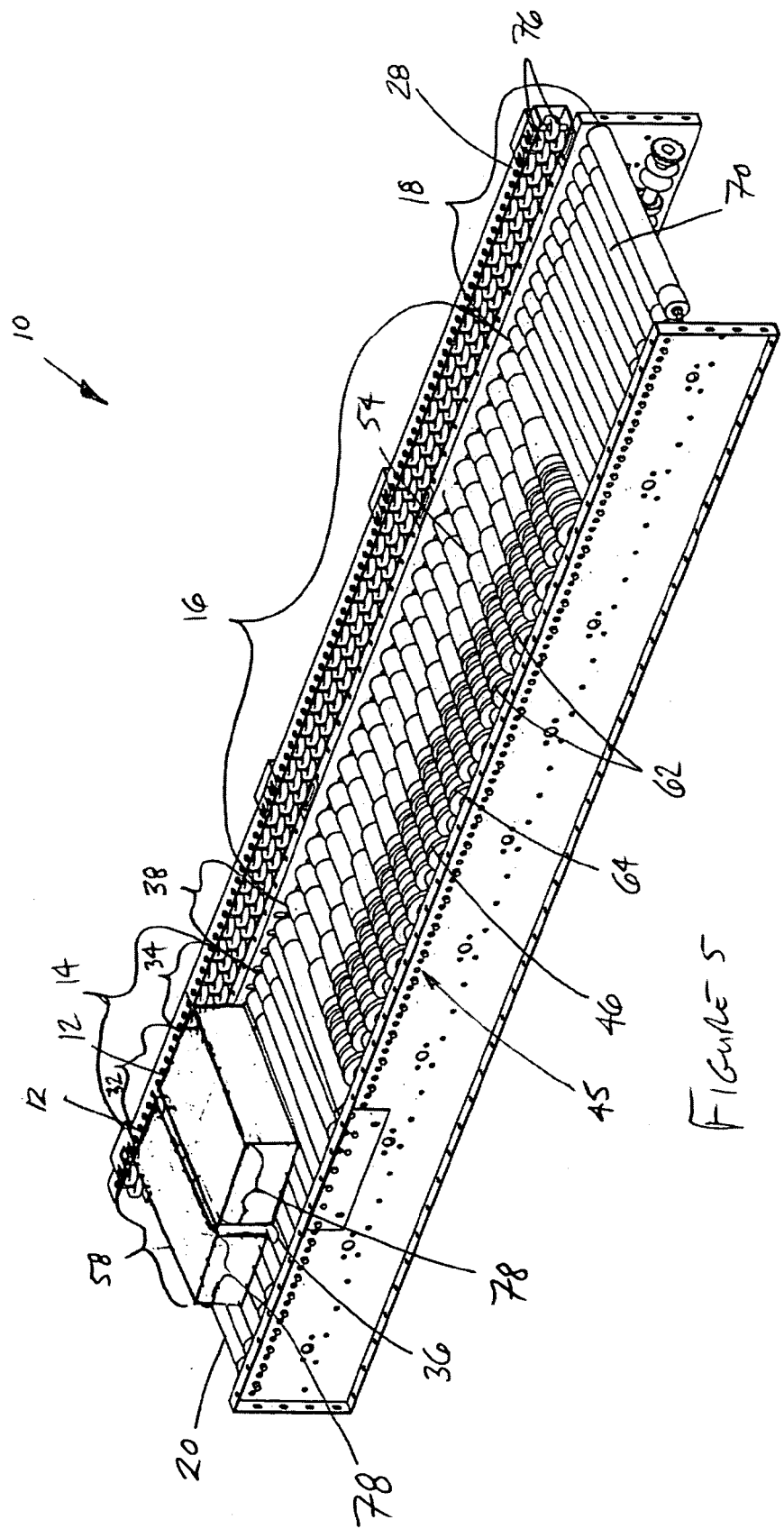
FIG. 5 is a perspective view of the case rotating system of claim 1 with cases positioned on a case input module of the case rotating system.

During use, the case input module 14 may be feed with cases 12 by a gantry, a layer pick, a storage device, a horizontal line, or other appropriate device. Cases 12 may move at a first rate of speed on the case input module 14 toward the case rotating module 16 as shown in FIG. 5. The cases 12 may be moved against a guardrail 28 to prepare the cases 12 to be transferred to the case rotating module 16. Before entering the case rotating module 16, the cases 12 may be separated a distance sufficient to enable the cases 12 to rotate in the case rotating module 16 without contacting each other. The cases 12 may be separated with a second section 34 of the case input module 14 moving cases 12 at a rate of speed that is greater than a rate of speed the first section 32.

Figure 6:
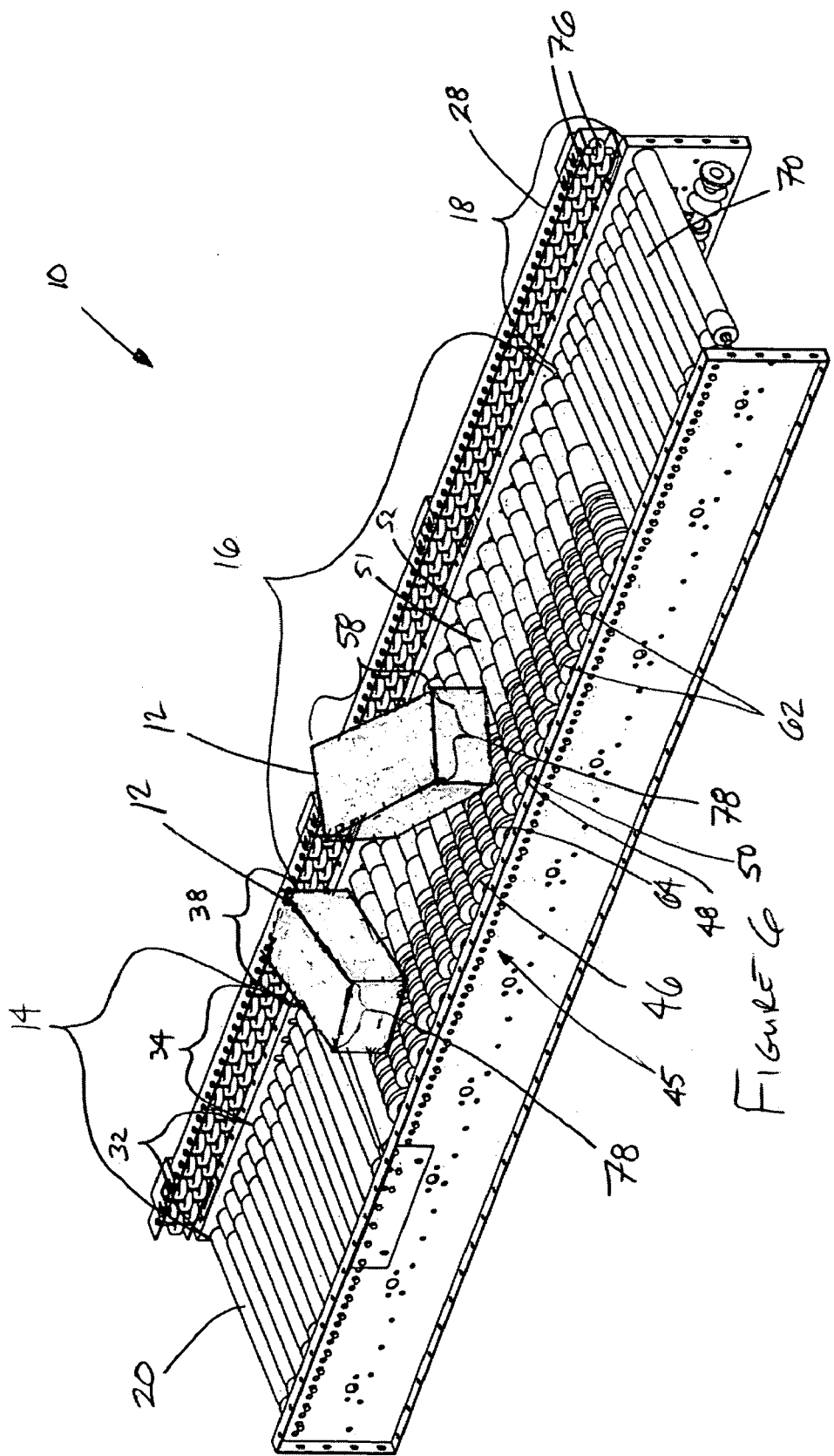
FIG. 6 is a perspective view of the case rotating system of claim with cases positioned on a case rotating module of the case rotating system.
Figure 7:
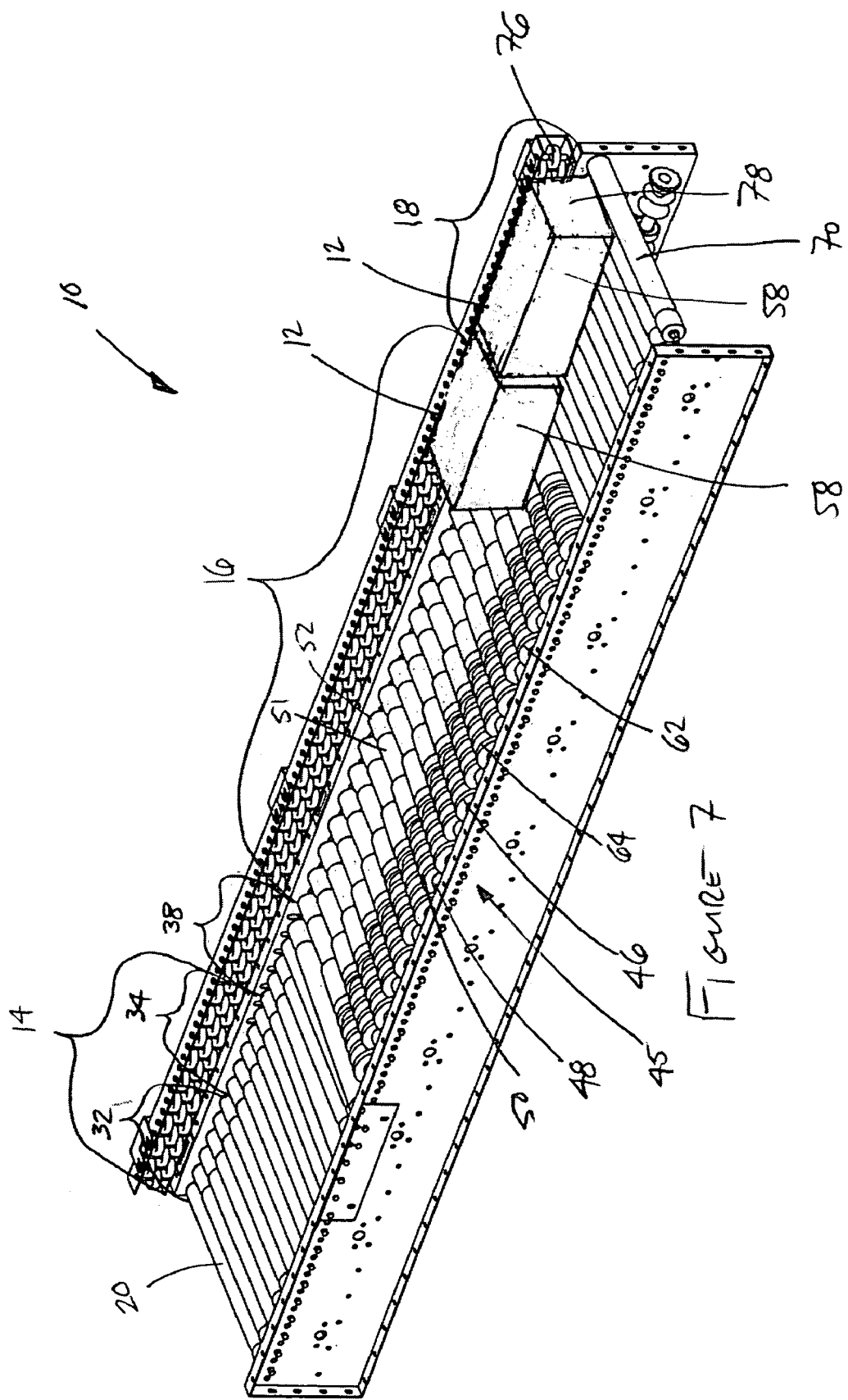
FIG. 7 is a perspective view of the case rotating system with cases positioned on a case output module of the case rotating system.

The cases 12 may then pass to the transition module 38 to be transferred to the case rotating module 16 and contact the rollers 46. An outer surface 50 is greater than a rotational velocity of an outer surface 51. In one embodiment, the rotational velocity of the rings 64 forming the conical portion 56 of the conical roller 46 is greater than the rotational velocity of the remaining portion of the conical roller 46 having an outer diameter that is less than the rings 64. Thus, the portion of the case 12 that contacts the outer surface 50 or the rings 64 is moved at a faster pace than the outer surface 51 or other portions of the case 12 that contact portions of the conical roller having an outer diameter less than the rings 64. Such motion causes a short side 78 of the case 12 to be rotated to lead the case 12 as the case 12 moves through the case rotating system 10 as shown in FIG. 6. The short side 78 is positioned generally orthogonal to the guardrail 28 as shown in FIG. 7. The case 12 may then be transferred to the case output module 18 and spaced appropriately.

In one embodiment, the case output module 18 may operate at a speed generally equivalent to the first section 32 of the case input module to return the cases 12 to a spacing arrangement generally equivalent to the spacing that was present when the cases 12 entered the system. In another embodiment, the cases 12 may be separated further apart than a spacing at which the cases 12 entered the case input module 14 or may be spaced in other appropriate configurations. The cases may be feed from the case output module 18 to an automated or manual device, or other appropriate device.

In one example, the case drive section 63 may be sized such that a convention case 12 containing twelve carbonated beverage cans may be handled in the previously set forth manner. A conventional case 12 for these beverages has a short side 78 that is slightly larger than a width of three adjacent cans and a long side 58 that is slightly larger than a width of four adjacent cans. If the case drive section 63 of the rollers 46 in the case rotating module 16 is configured to have a width larger than the short side 78, but less than the long side 58, the case rotating module 16 rotates cases not having a short side 78 leading so that upon exiting the case rotating module 16, a short side 78 of the case leads. In addition, cases 12 entering the case rotating module 16 in a correct orientation in which the short side 78 of the case 12 is leading are not rotated, but instead, exit the case rotating module 16 with the short side 78 leading.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A case rotating system, comprising:
    a case input module adapted to move at least one case within the case rotating system;
    a case rotating module comprising at least one conical roller positioned proximate to the case input module in a position to receive the at least one case from the case input module;
    wherein the at least one conical roller includes a first end having an outer surface diameter that is larger than an outer surface diameter of a second end of the at least one conical roller positioned to contact the at least one case;
    wherein the case rotating module comprises a plurality of conical rollers having conical outer contact surfaces;
    wherein the longitudinal axes of at least a portion of the plurality of conical rollers are nonparallel and nonorthogonal relative to a longitudinal axis of the case rotating system.

2. The case rotating system of claim 1, wherein the at least one conical roller includes a case drive section positioned proximate to the second end of the at least one conical roller in a position to contact the at least one case.

3. The case rotating system of claim 2, wherein the case drive section is positioned to contact the at least one case and has a length that is at least as wide as a short side of the at least one case yet smaller than a length of a long side of the at least one case.

4. The case rotating system of claim 1, wherein the longitudinal axes of at least a portion of the plurality of conical rollers are aligned relative to the longitudinal axis of the case rotating system such that the first end having an outer surface diameter that is larger than an outer surface diameter of the second end of each conical roller is positioned further downstream than the second end.

5. The case rotating system of claim 4, wherein the longitudinal axes of at least a portion of the plurality of conical rollers form an angle less than about twenty degrees with a line orthogonal to the longitudinal axis of the case rotating system.

6. The case rotating system of claim 5, wherein the longitudinal axis of each of the plurality of conical rollers form an angle less of between about one degree and about 10 degrees with a line orthogonal to the longitudinal axis of the case rotating system.

7. The case rotating system of claim 5, wherein the case input module comprises a plurality of rollers having longitudinal axes positioned at an angle substantially equal to the angle at which the plurality of conical rollers are positioned relative a line orthogonal to the longitudinal axis of the case rotating system.

8. The case rotating system of claim 7, further comprising a case output module positioned proximate to the case rotating module for receiving cases from the case rotating module, wherein the case output module comprises a plurality of rollers positioned at an angle relative to a line orthogonal to the longitudinal axis of the case rotating system that is generally greater than the angle at which the plurality of conical rollers of the case input module are positioned relative to a line orthogonal to the longitudinal axis of the case rotating system.

9. The case rotating system of claim 1, further comprising a transition module positioned between the case input module and the case rotating module to provide a transition between an upper support surface on the case input module and an upper support surface of the case rotating module.

10. A case rotating system, comprising:
a case input module adapted to move at least one case within the case rotating system;
a case rotating module comprising at least one roller of the case rotating module positioned proximate to the case input module in a position to receive the at least one case from the case input module;
wherein the at least one roller of the case rotating module includes a first end having an outer surface that is configured to rotate at a first rotational velocity that is faster than a second rotational velocity at which an outer surface of a second end of the at least one conical roller positioned to contact the at least one case is configured to rotate;
wherein the at least one roller of the case rotating module comprises a plurality of rollers, wherein at least a portion of the rollers having longitudinal axes that are aligned relative to the longitudinal axis of the case rotating system such that the first end having an outer surface diameter that is larger than an outer surface diameter of the second end of each conical roller is positioned further downstream than the second end.

11. The case rotating system of claim 10, wherein the at least one roller of the case rotating module comprises a plurality of rollers, wherein at least a portion of the rollers having longitudinal axes that are orthogonal relative to the longitudinal axis of the case rotating system.

12. The case rotating system of claim 10, wherein the longitudinal axes of at least a portion of the plurality of rollers form an angle less than about twenty degrees with a line orthogonal to the longitudinal axis of the case rotating system.

13. A case rotating system, comprising:
a case input module adapted to move at least one case within the case rotating system;
a case rotating module comprising at least one conical roller positioned proximate to the case input module in a position to receive the at least one case from the case input module;
wherein the at least one conical roller includes a first end having an outer surface diameter that is larger than an outer surface diameter of a second end of the at least one conical roller positioned to contact the at least one case;
wherein the case input module comprises a first section configured to move the at least one case at a first rate of speed and a second section positioned between the first section and the case rotating module and configured to move the at least one case at a second rate of speed that is greater than the first rate of speed to increase distances between adjacent cases to facilitate unobstructed rotation of cases in the case rotating module.

14. The case rotating system of claim 13, wherein the case rotating module is configured to move the at least one case generally at the second rate of speed.

15. The case rotating system of claim 14, further comprising a case output module positioned proximate to the case rotating module for receiving cases from the case rotating module, wherein the case output module is configured to move the cases at a rate of speed less than the second rate of speed, which causes the distance between adjacent cases to be reduced.

16. A case rotating system, comprising:
a case input module adapted to move at least one case within the case rotating system;
a case rotating module comprising at least one conical roller positioned proximate to the case input module in a position to receive the at least one case from the case input module;
wherein the at least one conical roller includes a first end having an outer surface diameter that is larger than an outer surface diameter of a second end of the at least one conical roller positioned to contact the at least one case;
wherein the case rotating module comprises at least one first conical roller formed from an outer surface comprised of a plurality of rings having outer surfaces that have outer surface diameters of progressively smaller diameters moving from the first end to the second end of the at least one first conical roller.

17. The case rotating system of claim 16, wherein the at least one first conical roller comprises a plurality of conical rollers having longitudinal axes that are generally parallel.

18. The case rotating system of claim 17, wherein the plurality of conical rollers each include a plurality of rings having outer surfaces that have outer surface diameters of progressively smaller diameters moving from the first end to the second end of the at least one first conical roller; wherein the rings are offset along the longitudinal axis of every other conical roller such that the rings may fit into a gap created between adjacent rings of an adjacent conical roller.

19. The case rotating system of claim 16, further comprising a guardrail positioned generally parallel with a longitudinal axis of the case rotating system and proximate to the second end of the at least one conical roller.

20. The case rotating system of claim 19, wherein the guardrail comprises a plurality of rollers positioned generally orthogonal to the longitudinal axis of the case rotating system to facilitate movement of the at least one case through the case rotating system.

21. A case rotating system, comprising:
a case input module adapted to move at least one case within the case rotating system;
a case rotating module comprising at least one roller of the case rotating module positioned proximate to the case input module in a position to receive the at least one case from the case input module;
wherein the at least one roller of the case rotating module includes a first end having an outer surface that is configured to rotate at a first rotational velocity that is faster than a second rotational velocity at which an outer surface of a second end of the at least one conical roller positioned to contact the at least one case is configured to rotate;
wherein the case input module comprises a first section configured to move the at least one case at a first rate of speed and a second section positioned between the first section and the case rotating module and configured to move the at least one case at a second rate of speed that is greater than the first rate of speed to increase distances between adjacent cases to facilitate unobstructed rotation of cases in the case rotating module.

22. The case rotating system of claim 21, further comprising a case output module positioned proximate to the case rotating module for receiving cases from the case rotating module, wherein the case output module is configured to move the cases at a rate of speed less than the second rate of speed, which causes the distance between adjacent cases to be reduced.

23. The case rotating system of claim 21, further comprising a guardrail positioned generally parallel with a longitudinal axis of the case rotating system and proximate to the second end of the at least one roller of the case rotating module.

24. A case rotating system, comprising:
a case input module adapted to move at least one case within the case rotating system;
a case rotating module comprising at least one roller of the case rotating module positioned proximate to the case input module in a position to receive the at least one case from the case input module;
wherein the at least one roller of the case rotating module includes a first end having an outer surface that is configured to rotate at a first rotational velocity that is faster than a second rotational velocity at which an outer surface of a second end of the at least one conical roller positioned to contact the at least one case is configured to rotate;
wherein the case input module comprises a plurality of rollers that are nonparallel and nonorthogonal relative to a line generally orthogonal to a longitudinal axis of the case rotating system such that that at least one case is directed to one side of the case input module.

25. The case rotating system of claim 24, further comprising a transition module positioned between the case input module and the case rotating module to provide a transition between an upper support surface on the case input module and an upper support surface of the case rotating module.

26. The case rotating system of claim 24, wherein the at least one roller of the case rotating module comprises a case drive section having a width that is at least as long as a width of a short side of the at least one case, wherein the case drive section is positioned at the second end of the at least one roller and is configured to operate at the second rotational velocity.

27. The case rotating system of claim 24, wherein the at least one roller of the case rotating module has outer surface formed from a conical shape proximate to the first end.

28. The case rotating system of claim 27, wherein the at least one roller of the case rotating module includes at least one ring having an outer surface diameter greater than an outer surface diameter of a case drive section of the roller positioned to contact a case passing through the case rotating system.

29. The case rotating system of claim 28, wherein the at least one ring is formed from a helical shape.

30. The case rotating system of claim 28, wherein the at least one roller of the case rotating module comprises a plurality of conical rollers each formed from a plurality of rings positioned along a longitudinal axes of the conical rollers.

31. The case rotating system of claim 30, wherein the plurality of conical rollers have longitudinal axes that are aligned generally parallel to each other.

32. The case rotating system of claim 24, further comprising a case output module positioned proximate to the case rotating module for receiving cases from the case rotating module, wherein the case output module comprises a plurality of rollers.

* * * * *